United States Patent [19]

Matsuda et al.

[11] 3,891,715

[45] June 24, 1975

[54] PROCESS FOR POLYMERIZATION OF TETRAHYDROFURAN

[75] Inventors: Kazuo Matsuda, Wakayama; Yoshiaki Tanaka, Osaka; Takeyo Sakai, Wakayama, all of Japan

[73] Assignee: Kao Soap Co., Ltd., Tokyo, Japan

[22] Filed: Nov. 16, 1972

[21] Appl. No.: 307,237

[30] Foreign Application Priority Data

Nov. 22, 1971 Japan................................ 46-93933

[52] U.S. Cl............................................. 260/615 B
[51] Int. Cl............................................. C07c 47/02
[58] Field of Search ................................. 260/615 B

[56] References Cited
UNITED STATES PATENTS

| | | | |
|---|---|---|---|
| 2,751,419 | 6/1956 | Hill et al. ......................... | 260/615 B |
| 2,856,370 | 10/1958 | Muetterties ...................... | 260/615 B |
| 3,358,042 | 12/1967 | Dunlop et al. ................... | 260/615 B |
| 3,454,652 | 2/1969 | Dunlop et al. ................... | 260/615 B |
| 3,487,115 | 12/1969 | Lovell ............................ | 260/615 B |
| 3,712,930 | 1/1973 | Matsuda et al.................. | 260/615 B |
| 3,714,266 | 1/1973 | Matsuda et al.................. | 260/615 B |

FOREIGN PATENTS OR APPLICATIONS 766,208   6/1953   Germany......................... 260/615 B

OTHER PUBLICATIONS

Mueller, Inorganic Chemistry, John Wiley & Sons, New York, 1957, p. 442.
Mellors, Modern Inorganic Chemistry, Longmans Green & Co., London, 1952, pp. 518–519.

*Primary Examiner*—Howard T. Mars
*Attorney, Agent, or Firm*—Woodhams, Blanchard and Flynn

[57] ABSTRACT

Tetrahydrofuran is polymerized in the presence of a catalyst system of (1) 5 to 50 percent by weight, based on the amount of tetrahydrofuran, of fuming sulfuric acid containing 15 – 43 wt. % of $SO_3$, and (2) 0.05 – 200 percent by weight, based on the weight of the fuming sulfuric acid, of a perchlorate. The reaction temperature is −20 to +10°C.

4 Claims, No Drawings

PROCESS FOR POLYMERIZATION OF TETRAHYDROFURAN

BACKGROUND OF THE INVENTION

1. Field of the Invention

This invention relates to a process for ring-opening polymerization of tetrahydrofuran in the presence of a catalyst of a fuming sulfuric acid-perchlorate system.

2. DESCRIPTION OF THE PRIOR ART

Ordinarily, tetrahydrofuran is subjected to ring-opening polymerization in the presence of a Lewis acid catalyst and some of the protonic acids, and there are produced various polymers ranging in state from liquid to solid, depending on the degree of polymerization. Of these polymers, polytetramethylene-glycols which have a molecular weight of 1000 – 3000 and contain hydroxyl groups at both terminal ends thereof have recently become industrially important especially as starting materials of polyurethanes.

It is necessary to stop the polymerization by adding water and then hydrolyzing the chlorine atoms, acetylester groups, etc. at the terminals of the polymer to convert same completely to hydroxyl groups for obtaining a polymer having diols at both ends. However, fluorosulfuric acid or acetic anhydride-perchloric acid (70% aqueous solution) which is ordinarily used as the polymerization initiator requires severe hydrolysis conditions and involves such a problem that it corrodes the materials of the polymerization equipment.

We have proposed a process using fuming sulfuric acidperchloric acid system as initiator for the polymerization of tetrahydrofuran (U.S. Ser. No. 18298, now U.S. Pat. No. 3,714,266 ). However, this process is still insufficient to overcome these defects completely.

We have extensively investigated in order to solve these problems and discovered a process for polymerizing tetrahydrofuran in the presence of a catalyst consisting of fuming sulfuric acid and a perchlorate.

SUMMARY OF THE INVENTION

This invention provides a process for polymerization of tetrahydrofuran in the presence of fuming sulfuric acid and about 0.05 - about 200 percent by weight of a perchlorate, based on the weight of the fuming sulfuric acid.

The initiator of the fuming sulfuric acid-perchlorate system in the present invention is excellent over the initiator of the previous fuming sulfuric acid-perchloric acid system in the following points:

1. Since there is a fear of explosion in the case of perchloric acid when it is maintained in the anhydrous state, it is usually marketed in the form of an aqueous solution. In contrast, in the case of a perchlorate, it is possible to employ an anhydrous salt, and therefore, bad influences by water can be removed and a problem of danger in handling such as corrosion of skin may be eliminated.

2. As in the case of the initiator of the fuming sulfuric acid-perchloric acid system, it is possible in the case of the initiator of the fuming sulfuric acid-perchlorate system to adjust the molecular weight of the resulting polymer by adjusting the amount added of the initiator. Moreover, the control of the molecular weight may be made also by changing the ratio of the perchlorate to fuming sulfuric acid.

3. Higher yields of polymers can be obtained and polymers of a higher molecular weight can be prepared.

4. The perchlorate can readily be recovered in a high yield from waste water coming from the polymerization stopping-hydrolysis-neutralization step, and the recovered perchlorate can be used repeatedly for the polymerization as it is.

Fuming sulfuric acid to be used in this invention has a concentration of about 15 to about 43% of $SO_3$ (based on the weight; same will apply hereinbelow) and the use of fuming sulfuric acid having a concentration outside this range is not preferred because of discoloration and low yields. It is industrially preferred to use fuming sulfuric acid having a free $SO_3$ concentration of about 23 – 28% which is readily available commercially.

As the perchlorate to be used in this invention, there may be mentioned, for instance, alkaline earth metal perchlorates such as magnesium perchlorate and barium perchlorate, alkali metal perchlorates such as sodium perchlorate and lithium perchlorate; and perchlorates of other metals such as iron perchlorate.

These perchlorates are used in amounts of about 0.05 to about 200% by weight based on the weight of fuming sulfuric acid, but an amount less than 50% is preferred.

The initiator of this invention is used in such an amount that the amount of fuming sulfuric acid is 5 to 50% by weight based on the weight of tetrahydrofuran.

As mentioned above, the adjustment of the molecular weight of the resulting polymer may be accomplished by changing the amount of the initiator added to tetrahydrofuran while maintaining the ratio of the perchlorate to fuming sulfuric acid at a certain level or by changing the amount of fuming sulfuric acid or perchlorate while keeping the amount of perchlorate or fuming sulfuric acid constant.

The sequence of addition of the components of the initiator is not particularly critical, but it is most preferred to adopt a method comprising dissolving a perchlorate into tetrahydrofuran and adding fuming sulfuric acid dropwise to the resulting solution.

The polymerization reaction may be carried out by contacting tetrahydrofuran with the catalyst of this invention in either the presence or the absence of a solvent. The use of a solvent is not essential in this invention, and it is possible to use a solvent if it will not cause disadvantages to the polymerization reaction.

The polymerization reaction may be carried out either in air or in a nitrogen atmosphere, if the reaction is kept free from moisture; the polymerization is conducted at a temperature of from −20°C. to +10°C.

The polymerization reaction is stopped by adding water to the reaction mixture. Then, the reaction mixture is heated to recover non-reacted tetrahydrofuran from the mixture and then it is maintained at a temperature of 90° to 100°C. to complete the hydrolysis of the sulfuric acid ester radicals of the polymer at both ends of the polymer molecules. The mixture is cooled to separate the polymer having terminal hydroxyl groups at both ends of the molecule (that is, polytetramethylene glycol) as an upper oil layer. The oil layer is collected and subjected to neutralization, dehydration and desalting steps to obtain the purified polymer.

This invention will now be illustrated in more details by reference to Examples in which all of "parts" and percent values are on the weight basis, unless otherwise indicated.

EXAMPLE 1

A 500-ml. three-necked flask equipped with a stirrer, a thermometer, a reflux condenser and a dropping funnel was charged with 100 g of tetrahydrofuran, into which 70% perchloric acid or anhydrous magnesium perchlorate (in an amount of 1 g, 3 g or 5 g) was dissolved at room temperature by effecting agitation under heat. The charge was externally cooled and while maintaining the inside temperature at −4°C. to 2°C., 21 g of 28% fuming sulfuric acid was added dropwise to the solution. After completion of the dropwise addition, the temperature of the reaction mixture was maintained at −6°C. ±1°C. for 2 hours. The polymerization reaction was stopped by addition of 130 g of water, and unreacted tetrahydrofuran was recovered by heating the reaction mixture on a hot water bath. Then, the reaction mixture was heated at 90°–100°C. for 2 hours under agitation and heating to effect the hydrolysis of the terminal ends of the polymer. When the agitation was stopped and the reaction mixture was allowed to stand, it was separated into two layers. The upper layer was collected and subjected to the steps of neutralization dehydration and desalting to obtain a purified polyether having hydroxyl groups at both terminal ends.

Results of the analysis are as follows:

| Analysis Item | Initiator | | | | | |
|---|---|---|---|---|---|---|
| | 1 g of $Mg(ClO_4)_2$ | 1 g of 70% $HClO_4$ | 3 g of $Mg(ClO_4)_2$ | 3 g of 70% $HClO_4$ | 5 g of $Mg(ClO_4)_2$ | 5 g of 70% $HClO_4$ |
| Polymer yield (%) | 73.1 | 67.8 | 68.4 | 51.6 | 67.5 | 50.8 |
| Average molecular weight ($\overline{Mn}$) calculated from OH value | 2482 | 1680 | 5620 | 1325 | 6884 | 1306 |
| Chlorine content (%) | 0 | 0 | 0 | 0 | 0 | 0 |
| Color (APHA) | 15 | 25 | 25 | 25 | faintly yellow | 25 |

From the results shown in the above table, it can readily be understood that the initiator of the magnesium perchlorate-fuming sulfuric acid system gives a polymer of a higher molecular weight in a higher yield than the initiator of the perchloric acid-fuming sulfuric acid system. Further, it is seen that the molecular weight of the polymer can be heightened by increasing the amount added of magnesium perchlorate to fuming sulfuric acid.

EXAMPLE 2

In accordance with the method described in Example 1, 0.476 part of anhydrous magnesium perchlorate was dissolved in 100 parts of tetrahydrofuran, 10 parts of 28% fuming sulfuric acid was added to the solution, and the polymerization was carried out to obtain a polytetramethylene-glycol having an average molecular weight ($\overline{Mn}$) of 3760 and a color (APHA) of 10 – 15 in a polymer yield of 62.2%.

EXAMPLE 3

A 500-ml four-necked flask equipped with a stirrer, a thermometer, reflux condensed and a dropping funnel was charged with 100 parts of tetrahydrofuran, into which 3.76 parts of sodium perchlorate ($NaClO_4 \cdot H_2O$) was dissolved. Then, the mixture was cooled and the temperature was maintained at −5°C. to −3°C. In this state, 21 parts of 28% fuming sulfuric acid was added dropwise to the mixture and the polymerization and aftertreatments were carried out in the same manner as in Example 1 to obtain a polytetramethylene-glycol product. Results of the analysis are as follows:

| | |
|---|---|
| Polymer yield | 70.7% |
| Average molecular weight calculated from OH value | 2200 |
| Chlorine content (%) | 0 |
| Color (APHA) | 10 – 15 |

EXAMPLE 4

0.7 part of lithium perchlorate ($LiClO_4 \cdot 3H_2O$) was dissolved at room temperature into a mixture of 100 parts of tetrahydrofuran and 30 parts of dichloroethane. While the solution was cooled to −4°C. under agitation, 21 parts of 28% fuming sulfuric acid was added and dissolved in the solution. Subsequent treatments were carried out in the same manner as in Example 1 to obtain a polytetramethylene-glycol having hydroxyl groups at both terminal ends. Results of the analysis are as follows:

| | |
|---|---|
| Polymer yield | 50.6% |
| Average molecular weight calculated from OH value | 1367 |
| Chlorine content (%) | 0 |
| Color (APHA) | 15 – 20 |

EXAMPLE 5

5.22 parts of barium perchlorate $[Ba(ClO_4)_2 \cdot 3H_2O]$ was dissolved in 100 parts of tetrahydrofuran, and the mixture was cooled at a temperature of −7° ± 3°C. While the mixture was maintained at this temperature, 21 parts of 28% fuming sulfuric acid was added dropwise to the mixture. Subsequent treatments were carried out in the same manner as in Example 1. Results of the analysis are as follows:

| | |
|---|---|
| Polymer yield | 72.2% |
| Average molecular weight calculated from OH value | 1865 |
| Chlorine content (%) | 0 |
| Color (APHA) | 10 – 15 |

EXAMPLE 6

3.08 parts of iron perchlorate [$Fe(ClO_4)_3 \cdot XH_2O$] (in which X indicates the number of moles of water of crystallization) was dissolved in 100 parts of tetrahydrofuran, and while the solution was maintained at −6°C., 21 parts of 28% fuming sulfuric acid was added dropwise to the solution. Subsequent treatments were carried out in the same manner as in Example 1 to obtain the following results:

| | |
|---|---|
| Polymer yield | 69.2% |
| Average molecular weight calculated from OH value | 6980 |
| Chlorine content | 0 |

COMPARATIVE EXAMPLE

In a 500-ml flask from which moisture was shut out, 20 parts of anhydrous magnesium perchlorate was dissolved in 100 parts of tetrahydrofuran, and the flask was sealed and allowed to stand at room temperature for 3 days. Although the aftertreatments were carried out in the same manner as in Example 1, no polymer was obtained.

When the above procedures were repeated with use of sodium perchlorate ($NaClO_4 \cdot H_2O$), no polymer was obtained.

The embodiments of the invention in which an exclusive property or privilege is claimed are defined as follows:

1. A process for the polymerization of tetrahydrofuran which comprises polymerizing tetrahydrofuran at a temperature in the range of −20°C to +10°C, in the absence of water, and in the presence of (1) from 5 to 50 percent by weight, based on the weight of tetrahydrofuran, of fuming sulfuric acid containing from about 15 to about 43 weight percent of $SO_3$ and (2) from about 0.05 to less than 50 percent by weight, based on the weight of said fuming sulfuric acid, of metal salt of perchloric acid selected from the group consisting of magnesium perchlorate, barium perchlorate, sodium perchlorate, lithium perchlorate and iron perchlorate, until a polymer is formed and then hydrolyzing the terminal groups of the polymer to obtain a polytetramethylene glycol product having hydroxyl groups at both terminal ends of the molecule.

2. The process as claimed in claim 1, wherein the free $SO_3$ content of said fuming sulfuric acid is in the range of from 23 percent by weight and 28 percent by weight.

3. The process as claimed in claim 1, wherein the polymerization reaction is carried out in the absence of a solvent.

4. The process as claimed in claim 1, wherein the polymerization is stopped by the addition of water, then heating the polymerization system to recover non-reacted tetrahydrofuran, further heating the polymerization system at 90°–100°C. to hydrolyze the polymer, cooling the polymerization system so as to separate the polymer having terminal hydroxyl groups at both ends of the molecule as an upper oil layer, subjecting the upper oil layer to neutralization, dehydration and desalting steps to obtain the purified polymer.

\* \* \* \* \*